(12) United States Patent  
Kohama

(10) Patent No.: US 8,582,149 B2  
(45) Date of Patent: Nov. 12, 2013

(54) PRINTING SETTING APPLICATION APPARATUS, METHOD, AND PROGRAM INVOLVING FILTERING PROCESSING

(75) Inventor: Yuji Kohama, Hokkaido (JP)

(73) Assignee: Seiko Epson Corporation, Tokyo (JP)

( * ) Notice: Subject to any disclaimer, the term of this patent is extended or adjusted under 35 U.S.C. 154(b) by 715 days.

(21) Appl. No.: 12/559,077

(22) Filed: Sep. 14, 2009

(65) Prior Publication Data

US 2010/0091324 A1    Apr. 15, 2010

(30) Foreign Application Priority Data

Oct. 10, 2008   (JP) .................................. 2008-263579

(51) Int. Cl.
    *G06F 3/12*    (2006.01)
(52) U.S. Cl.
    USPC .............................. 358/1.15; 358/1.1; 358/1.9
(58) Field of Classification Search
    USPC ........................................ 358/1.14, 1.15, 1.1
    See application file for complete search history.

(56) References Cited

U.S. PATENT DOCUMENTS

2006/0232811 A1*  10/2006  Yokoyama ................... 358/1.14  
2008/0024802 A1    1/2008  Kato  
2009/0219550 A1*   9/2009  Levin et al. .................... 358/1.1

FOREIGN PATENT DOCUMENTS

JP   2007-164321 A   6/2007  
JP    2008-33812 A   2/2008

* cited by examiner

*Primary Examiner* — Benny Q Tieu  
*Assistant Examiner* — Juan M Guillermety  
(74) *Attorney, Agent, or Firm* — Global IP Counselors, LLP

(57) ABSTRACT

A print setting display device includes: a print job data acquiring section which acquires print job data representing printing targets classified in accordance with a plurality of classification units; and a print setting acquiring section which acquires setting completion information representing print settings corresponding to the classification units; and a display control section which allows a predetermined display unit to display information representing the printing targets, the classification units, and the setting completion information.

6 Claims, 5 Drawing Sheets

PRINTING SETTING APPLICATION APPARATUS, METHOD, AND PROGRAM INVOLVING FILTERING PROCESSING

CROSS REFERENCES TO RELATED APPLICATIONS

The present invention contains subject matter related to Japanese Patent Application No. 2008-263579 filed in the Japanese Patent Office on Oct. 10, 2008, the entire contents of which are incorporated herein by reference.

BACKGROUND

1. Technical Field

The present invention relates to a technique for determining print settings.

2. Related Art

In recent years, XPS (XML Paper Specification) was standardized as a specification for electronically handling documents and started to be used in various situations. In XPS, by setting information called a print ticket in each of the layers corresponding to a job, a document, and a page, it is possible to execute print settings on a printing target in each of the layers (for example, JP-A-2008-33812).

SUMMARY

In XPS documents using the XPS, the print settings can be executed in each of the layers. However, when the print settings in each of the layers become complicated, it is difficult to grasp the print settings defined in each printing target. For this reason, it is difficult to precisely determine whether the desired print settings are executed on a desired printing target.

An advantage of some aspects of the invention is that it provides a technique for easily and precisely recognizing the print setting details which correspond to a printing target.

According to an aspect of the invention, there is provided a configuration in which printing targets are classified in accordance with a plurality of classification units. Setting completion information representing print settings corresponding to the classification units is acquired. A predetermined display unit displays information representing the printing targets, the classification units, and the setting completion information. That is, the printing targets of a print job are classified in accordance with the plurality of classification units. The display unit displays whether the print settings correspond to each classification unit. In some cases, the printing targets are classified in a complicated manner. For example, the same page is classified in different classification units in an overlapping manner. Moreover, in some cases, the print settings are complicatedly defined. Even in these cases, the print settings corresponding to the printing targets can be recognized easily and precisely.

Here, a function of acquiring print job data may acquire the print job data representing the printing targets classified in accordance with the plurality of classification units. The printing targets can be classified on the basis of various indexes. For example, when the printing targets are classified into the layers of a job, a document, and a page in accordance with the constituent elements of a document, the layers serve as the classification units. When the printing targets such as photos and documents are classified in accordance with the details of the printing targets, the details serve as the classification units.

A function of acquiring the print settings may acquire the print settings corresponding to the classification units as the setting completion information. Therefore, the print settings directly corresponding to the classification units may be acquired or the print settings indirectly corresponding to the classification units may be acquired. In the latter case, the print settings corresponding to each printing target and the classification of the printing targets may be acquired, the print settings corresponding to the classification units may be specified logically on the basis of the classification of the printing targets, and the print settings of each classification unit may be acquired. Alternatively, various configurations may be used. Of course, the setting completion information may be contained in the print job data in advance or a user may specify the setting completion information by inputting the setting completion information using an input unit. The print settings may be settings which are applied to the printing targets upon printing the printing targets. When the plurality of print settings can be executed, the print settings are specified by the types of print settings and the details of the respective print settings.

A display control function may display the classification units of the printing targets and the setting completion information, when the predetermined display unit displays information representing the printing targets. That is, this display may cause the user to recognize whether the print settings have been defined (setting completion) for one of the plurality of classification units. In addition, this display may cause the user to recognize the print settings corresponding to each printing target.

In a configuration in which the print settings made in the classification units such as the print job data of the XPS are applied in a specific order, the classification unit may be expressed. For example, a filtering processing function of applying the print settings to the printing targets with reference to the print job data may be used. In this configuration, print setting application completion information representing the result obtained by applying the print settings to the printing targets can be acquired by the filtering processing function. Therefore, by allowing the display unit to display the print setting application completion information to show the print settings in each classification unit, it is possible to supply a user with an image formed upon actual application of the print settings.

When an XPS printer driver permits printing on the basis of the print job data of the XPS, the XPS printer driver applies the plurality of print settings to the printing targets in a predetermined order. Therefore, in the filtering processing function, it is preferable that the same print settings as the plurality of print settings applied by the XPS printer driver are applied.

Various method of executing the display by the display unit may be used. For example, the details of the plurality of print settings may be regulated in advance and preset information may be defined. The preset information and information, which represents the classification units which are targets to which the plurality of print settings are applied in accordance with the preset information, is acquired as the setting completion information. As a consequence, the display unit displays the preset information and the classification units which are the target to which the print settings are applied in accordance with the preset information. Therefore, in a state where the plurality of print settings are preset and preset applying targets are selected in each classification unit, the preset and the preset applying targets can be recognized easily and precisely.

Of course, various methods may be used to select the preset information. For example, by allowing the display unit to display choices of the preset information, arbitrary preset information may be selected from the choices by an input operation of the input unit. In a UI where the printing targets or the classification units of the printing targets are displayed, the classification units to which the selected preset information is applied may be designated. As a consequence, existing preset information may be used. For example, the preset information representing the plurality of print settings applied in a printing job of print completion may be used as preset information applied to another print job. Various input methods such as copy & paste or drag & drop can be used upon designating the classification units used to select or apply the preset information.

A configuration in which an icon corresponds to the preset information may be used. That is, when a function of generating the preset information can be executed as a part of a print setting display program function or a function of another program module, the icon corresponding to the preset information may be defined. Icon information representing the icon is acquired and the setting completion information is displayed by the icon when the display unit displays the preset information as the setting completion information. As a consequence, the details of the print settings regarding the setting completion can be grasped easily using the icon when the user generating the preset information sets the printing. By displaying the setting completion information by the use of the icon intuitively expressing the details of the preset information, the user can grasp the details of the print settings regarding the setting completion.

A configuration in which the setting completion information can be clearly grasped may be configured. For example, when an operation of instructing the setting completion information is received in a configuration in which the predetermined input unit receives various instructions, the predetermined display unit may display the details of the print settings represented by the setting completion information. In this case, the setting completion information is displayed on the basis of the preset information where the details of the plurality of print settings are regulated. That is, by allowing the predetermined display unit to display the details of the print settings represented by the setting completion information, the set details regulated by the plurality of print settings can be grasped easily.

The technique for displaying the printing targets classified in accordance with the plurality of classification units in addition to the classification units and the setting completion information representing the print settings corresponding to the classification units can be applied to a device or a method. A program, a device, and a method may be realized by a single printing apparatus, a plurality of devices, or a combination thereof, or include various aspects of the invention. For example, by allowing a computer and a printing apparatus to cooperate with each other, the program, the device, and the method according to the aspects of the invention can be provided. The invention may be appropriately embodied by software in some aspects and by hardware in some aspects. In addition, the invention may be embodied by a recording medium of a program controlling the printing apparatus. Of course, the recording medium of the software may be a magnetic recording medium, a magneto-optic medium, or any medium which is developed in future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, an embodiment of the invention will be described in the following sequence:
(1) Configuration of Print Control Device:
(2) Print Control Process:
(3) Other Embodiments:

(1) Configuration of Print Control Device

Figure 1:
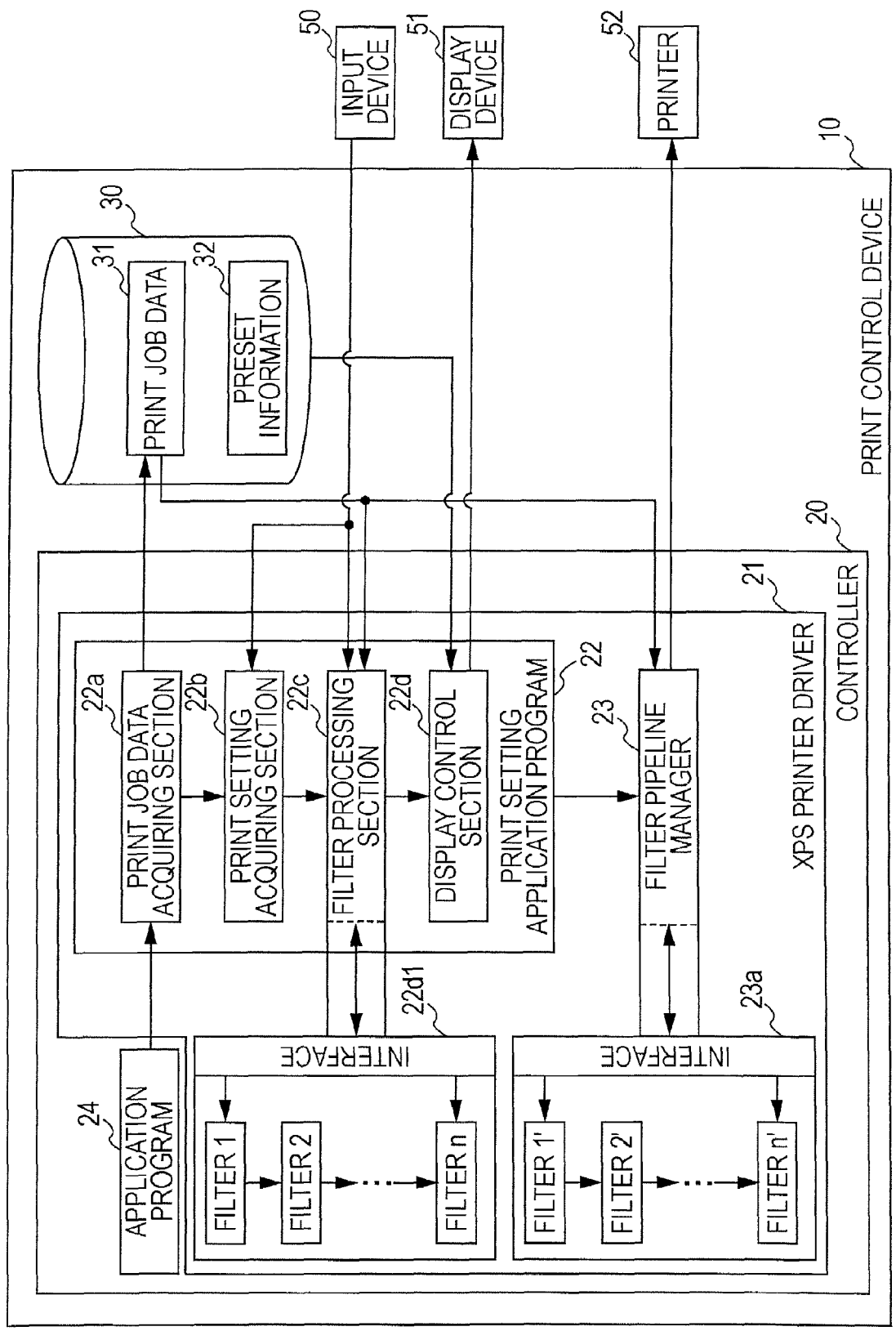
FIG. 1 is a block diagram illustrating the configuration of a print control device.

FIG. 1 is a block diagram illustrating the configuration of a print control device 10 according to the invention. The print control device 10 includes a controller 20 having a RAM, a ROM, a CPU, and the like and a storage medium 30. The controller 20 is capable of executing programs stored in the ROM or the storage medium 30. In this embodiment, an XPS printer driver 21 or an application program can be executed as one of the programs. The XPS printer driver 21 which is constructed by a program module for executing various functions has a function of receiving the details of print settings and a function of printing a printing target to which the received details of the print settings are applied.

The print control device 10 further includes an interface (not shown). An input device 50, a display device 51, and a printer 52 are connected to the print control device 10 through the interface. The input device 50 is a device such as a mouse, a keyboard, or the like for outputting signals corresponding to the details input by a user. The controller 20 specifies the details input by the user on the basis of the signals. The display device 51 is a device such as a display for displaying an arbitrary image in accordance with a signal output by the controller 20. The printer 52 is a printing device which prints an image represented by print data on the basis of the print data output by the controller 20. In this embodiment, the printer 52 executes printing on the basis of the print data subjected to rendering output by the controller 20.

An application program 24 is a module for allowing the controller 20 to execute a function of receiving the details operated by the input device 50 and generating sentences, images, or the like. The XPS printer driver 21 is a module for allowing the controller 20 to execute a function of receiving the print settings on the basis of print job data representing a printing target and a function of applying the print settings. That is, when the user instructs print execution (inputs a print job) on the basis of the execution of the application program 24, the controller 20 starts the XPS printer driver 21 so as to process the print job data representing the printing target associated with the print execution instruction.

The XPS printer driver 21 includes a print setting application program 22 and filters 1 to n which serve as a program module for changing the printing settings to determine the print settings of each classification unit of the printing target. The XPS printer driver 21 includes a filter pipeline manager 23 and filters 1' to n' which serve as a program module for applying the print settings and executing the printing after the print settings are changed.

Filters 1' to n' (where n is an integer of two or more) are filters which respectively apply a plurality of the print settings to a printing target described by print job data of the XPS. Filters 1' to n' are the filters included in a general XPS printer driver to handle the print job data of the XPS. Accordingly, a processing order of filters 1' to n' is predetermined in advance and the processing order cannot be changed. Filter n' which is the last to execute is a filter which executes the rendering.

That is, filter n' generates print data which can be printed by the printer 52 by executing a process of making XML-based data processed by the filters prior to filter n' into bitmap data, as well as a color conversion process, a halftone process, and a re-arrangement process. Filters 1' to (n-1)' apply the changes in the print settings by changing the XML-based data. That is, in this embodiment, the print settings are specified by information representing the types of print settings, such as an function overlapping a stamp mark, a function of scaling a stamp mark, or a Nup function (a function of printing N pages on the surface of one medium where N is an integer of two or more), and information representing the details of the print settings, such as the types of stamp, a scaling ratio, and an N value of the Nup. The types and details of the print settings are described by the XML-based data. Therefore, filters 1' and (n-1)' apply the changes in the print settings by editing the data describing the types and details of the printing settings corresponding to each filter.

In this embodiment, in order to handle the print job data of the XPS, the print jobs are classified in accordance with classification units such as a job, a document, and a page, so that a hierarchical structure where hierarchical layers are formed in accordance with the job, the document, and the page. That is, one print job is constituted by one or more documents and one document is constituted by one or more pages. Any printing target can be arbitrarily selected from pages constituting the job and the document. In addition, the print job data of the XPS can contain information (print ticket) corresponding to a job, a document, or a page. That is, the print settings can correspond to the classification unit. The application program 24 can specify the print settings when the print job is input. In this case, the print job data is constituted by information representing each page which is in a state where the print settings are not applied and information (print ticket) which allows the types and details of the print settings to be applied to correspond to each classification unit.

The controller 20 allows the filter pipeline manager 23 to execute a process of applying filters 1' to n' to the printing target. That is, the controller 20 gives an instruction to filters 1' to n' through the interface and applies the print settings decided at that time to the printing target, when the print execution instruction is executed using a preview UI, which is described below and displayed on the display device 51. In this case, the print data generated by the rendering of filter n' is output to the printer 52. The printer 52 executes the printing on the basis of this print data.

On the other hand, the print setting application program 22 includes a print job data acquiring section 22a, a print setting acquiring section 22b, a filtering processing section 22c, and a display control section 22d. The controller 20 allows the print job data acquiring section 22a to store the print job data (print job data 31) representing the printing target in the storage medium 30. The print job data 31 is a target which is subjected to a filtering process executed by the print setting application program 22 and the above-described filter pipeline manager 23.

The controller 20 allows the print setting acquiring section 22b to acquire a signal representing an operation executed on the preview UI by the user using the input device 50 and an instruction of the classification unit which is a print setting target. In addition, the controller 20 acquires an instruction of the types and details of the print settings corresponding to the instructed classification unit. When the print settings correspond to the classification unit, the details of the print settings are completely set. Therefore, here, information representing the completion of the print settings is called setting completion information.

The controller 20 allows the filtering processing section 22c to execute a process of applying the print settings of the selected page with reference to the print job data 31. In this embodiment, filters 1 to n (where n is an integer of two or more) are capable of processing the filtering process in number order from the smaller numbers. The filtering processing section 22c is capable of starting a process of applying the filtering process by designating data representing the page of a processing target through a predetermined interface. That is, the controller 20 allows the filtering processing section 22c to acquire information representing the types of print settings and the details of the print settings corresponding to these types of print settings in every classification unit, to give an instruction to apply the details of the print setting through an interface, and to execute a process of extracting the page of a processing target from the print job data 31 and applying filters 1 to n.

The core logics of filters 1 to n are the same as those of filters 1' to n', but the interfaces of filters 1 to n are different from those of filters 1' to n'. That is, in order for the controller 20 to permit the process of previewing the changed details of the print settings, each of filters 1 to n has an interface for applying the changed print settings to a print setting changing target (for example, the page of the changing target, etc.). Each of Filters 1' to n' has an interface for applying the print settings of the decided details to all pages and generating the print data.

In this embodiment, the core logics of filters 1 to n are the same as those of filters 1' to n' and the interfaces thereof are different from those of filters 1' to n'. The processing order of filters 1 to n is determined in advance and this order cannot be changed. Filter n which is the last to execute is a filter which executes the rendering. According to filter n' RGB data are converted into CMYK data before and after the color conversion process. Of course, the RGB data or the CMYK data are converted again into the RGB data to display an image on the display device 51. In addition, in executing the printing, print data generated on the basis of the CMYK data are used.

The controller 20 allows the display control section 22d to display information representing the printing target along with the classification unit and setting information on the preview UI of the display device 51. That is, the controller 20 allows the display control section 22d to display the preview UI used to change the print setting on the display device 51. At this time, the controller 20 permits displaying print setting non-application information, which represents a state where all the plurality of print settings are not applied to the printing target contained in the print job data 31, and print setting application completion information, which represents the application results of the print settings to the printing target.

The print setting non-application information specifies the hierarchical structure (classification unit) of the print jobs represented by the print job data 31 and also specifies setting completion information representing classifying targets to which the printing settings are applied when the print settings are completed. The print setting application completion information is displayed on the basis of image data which represents the results obtained from the rendering by filter n. In this way, when the print setting application completion information is displayed on the display device 51, the user can confirm the classification unit of each printing target, while viewing the preview UI. In addition, the user can execute the process of changing the print settings, while grasping the print settings corresponding to each classification unit.

In this embodiment, the controller 20 applies filters 1 to n with reference to the print job data 31 to reflect the change in the print settings. Accordingly, even when the print settings are changed, the changed print settings can be applied by executing the processes of filters 1 to n again with reference to the print job data 31. Since data representing each printing target in the print job data 31 represents the printing target to which the print settings are not applied, the desired print settings can be applied several times. Accordingly, it is possible to execute the change in the print settings.

(2) Print Control Process

Next, a printing process in the above-described configuration will be described. The controller 20 activates the XPS printer driver 21 in accordance with the print execution instruction of the application program 24 to execute processes shown in FIGS. 2 and 3. Upon executing the processes, the controller 20 allows the print job data acquiring section 22*a* to store the print job data 31 in the storage medium 30 (step S100).

Figure 4:
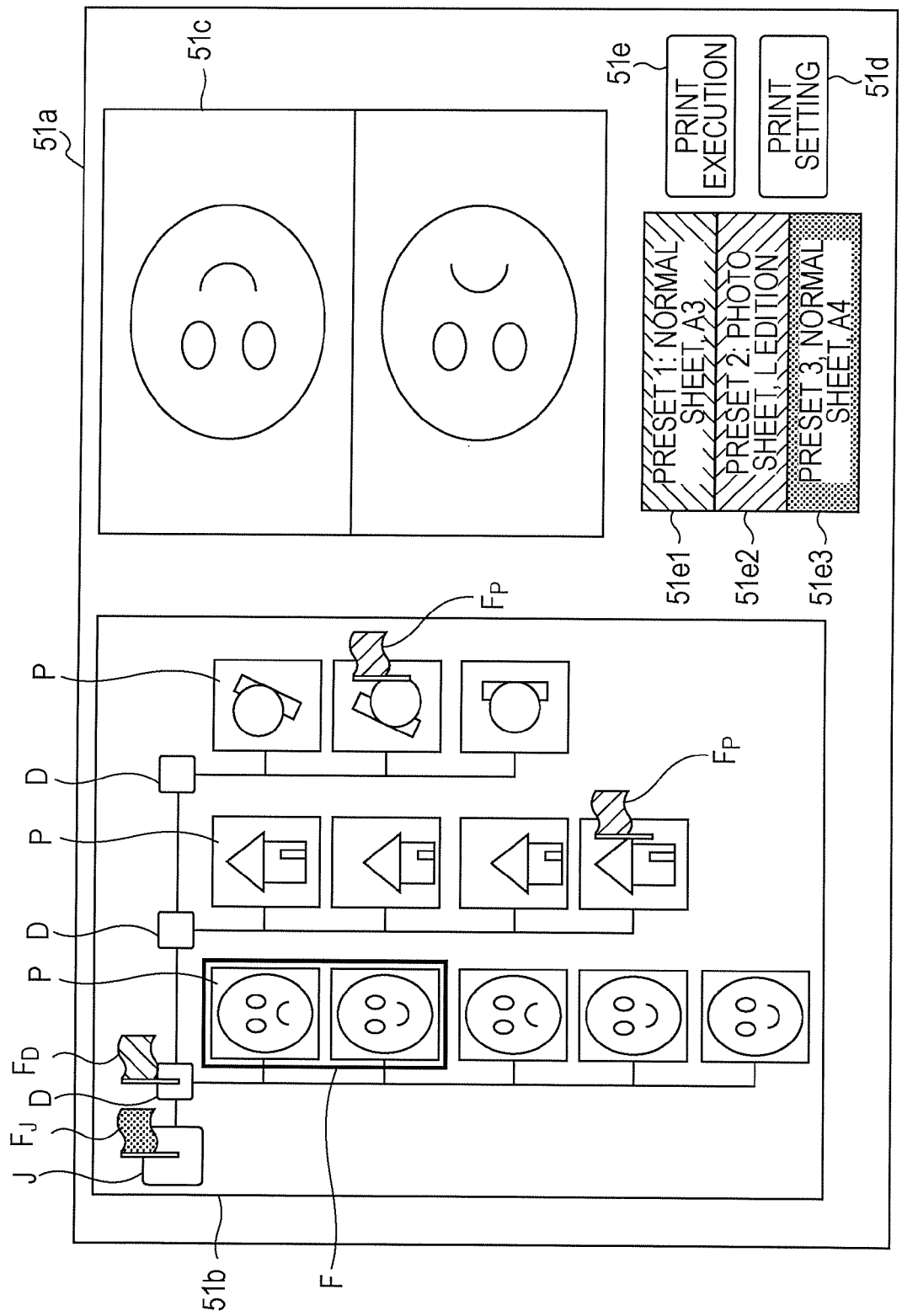
FIG. 4 is a diagram illustrating an example of a preview UI.

Subsequently, the controller 20 allows the display control section 22*d* to display the preview UI (step S105). FIG. 4 is a diagram illustrating an example of the preview UI. In FIG. 4, print setting non-application information 51*b* is shown on the left side of a rectangular preview window 51*a* and print setting application completion information 51*c* is shown on the right side thereof. In this embodiment, the print setting application completion information 51*c* on a printing target (which is a current page) selected from arbitrary printing targets is displayed.

In step S105 described above, a display is made on the basis of the print ticket contained in the print job data 31 together with the frame of the preview window 51*a*. That is, information representing the classification units (the hierarchical structure) of the print jobs represented by the print job data 31 and the setting completion information representing that the print settings have already been executed on the classification units are generated and displayed on the display device 51. Therefore, the controller 20 acquires the classification units of the print jobs with reference to the print job data 31, acquires information, which represents the printing setting when the print settings of the classification unit is defined in advance, as the setting completion information with reference to the above-described print ticket, and displays the information on the preview window 51*a*.

In the example shown in FIG. 4, an icon J (a rectangle with rounded corners) representing the job as the classification unit, an icon D (a rectangle with rounded corners) representing a document as the classification unit, and an icon P (a rectangle) representing a page as the classification unit are shown in the rectangular frame displaying the print setting non-application information 51*b*. In the example shown in FIG. 4, one job contains three documents. The three documents contain five pages, four pages, and three pages, respectively. In step S105, by linking the icons D of three documents contained in a certain job (the icon J) by the use of a line and disposing the icon J on the leftmost side, it is clearly shown that three documents are contained in a lower layer of a job layer on the basis of the hierarchical structure of the print job data 31. The pages contained in each document are indicated by the icons P linked by a line extending to the lower side of the icon D representing the document.

In the preview window 51*a*, flag icons $F_J$, $F_D$, and $F_P$ indicate that the print settings have already been defined for the classification units. That is, the icon $F_J$ indicates that certain print settings have already been defined for a job which is set as an application target. The icon $F_D$ indicates that certain print settings have already been defined for a document which is set as an application target. The icon $F_P$ indicates that certain print settings have already been defined for a page which is set as an application target. Accordingly, in the example shown in FIG. 4, the flag icons $F_J$, $F_D$, and $F_P$ serve as the setting completion information.

When the print settings are defined in every layer, the print settings are defined in an overlapping manner. In this case, the print settings may be specified on the basis of a predetermined application priority order of the print settings. For example, when the print settings are defined on a certain page and the print settings are thus defined on the job in a case where the application priority order is defined in such a manner that the application priority order is higher as a layer is lower, the print settings on the page are executed so that the print settings on the page which is a lower layer is applied.

In step S105, when the frame of the preview window 51*a* and the setting completion information based on the print ticket contained in the print job data 31 are displayed, the controller 20 executes a process of displaying the print setting non-application information 51*b* in step S110 to S120, and then executes a process of displaying the print setting application completion information 51*c* in step S125 to S155.

Figure 3:
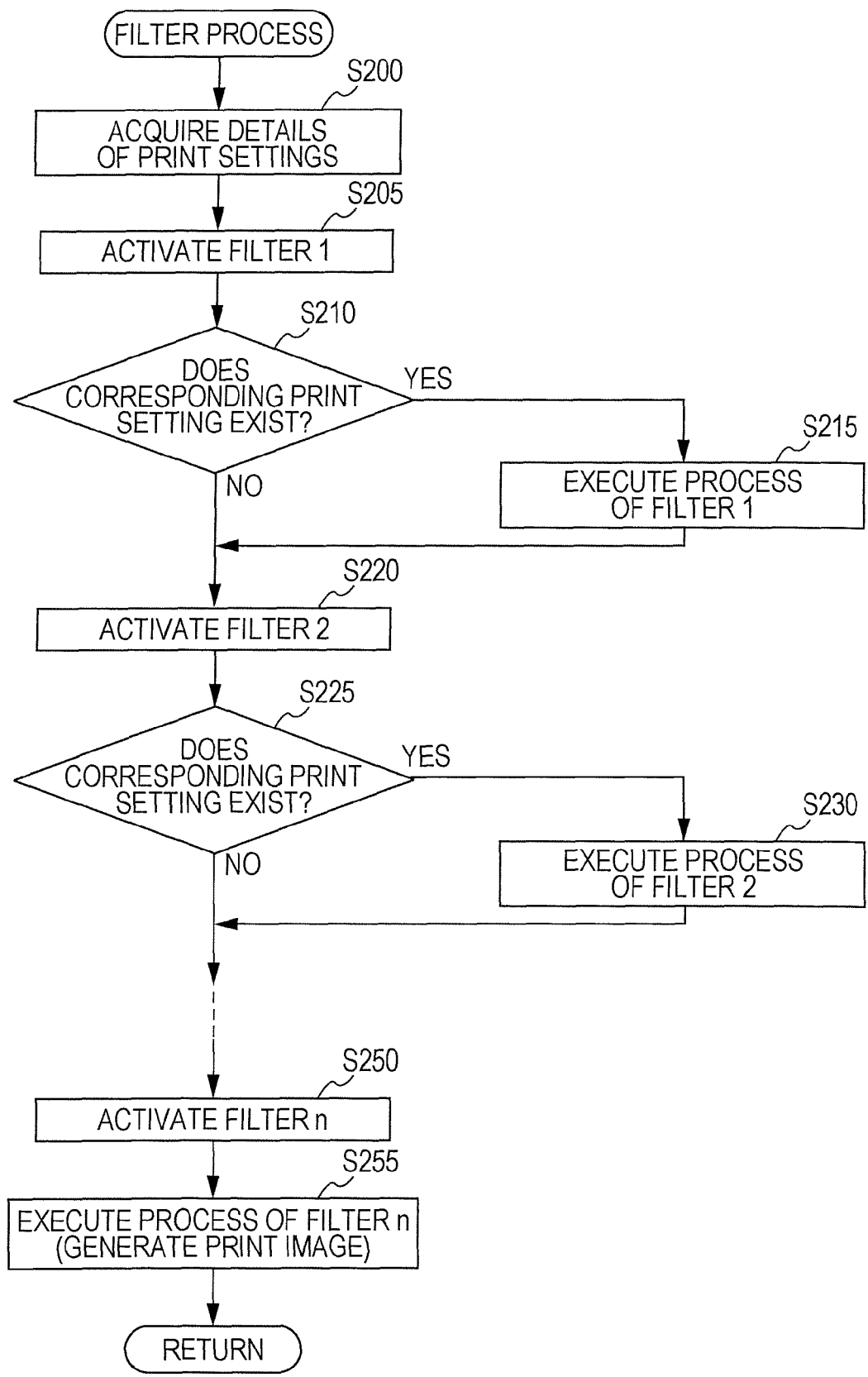
FIG. 3 is a flowchart illustrating a filtering process.

Specifically, the controller 20 allows the filtering processing section 22*c* to execute the filtering process to acquire a thumbnail image of each page which is the printing target contained in the print job data 31 (step S110). In step S115, it is determined whether the process ends for all the pages contained in the print job data 31. When it is determined that the process does not end for all the pages, step S110 is again executed by setting the non-processed pages as the processing target. FIG. 3 is a flowchart illustrating the filtering process. In the filtering process shown in FIG. 3, the controller 20 allows the filtering processing section 22*c* to acquire the print settings (step S200). That is, the plurality of filters 1 to n corresponds to the plurality of print settings, respectively. In filters 1 to n, each print setting is specified by a parameter transferred to each filter to apply the filter to the processing target page.

In step S200, the controller 20 thus acquires information representing the print settings. The print settings are appropriately selected in accordance with processing steps of the flowchart shown in FIG. 2. That is, in step S110 shown in FIG. 2, the filtering process is executed to acquire a thumbnail image of each page in a state where the print setting is not applied. Therefore, in step S110, the filtering process is executed using only filter n executing the rendering and the other filters are not applied. For this reason, when the filtering process shown in FIG. 3 is activated in step S110, the print settings corresponding to filters 1 to (n−1) are not defined for any one of processing target pages.

In the filtering process shown in FIG. 3, processes are executed for filters 1 to (n−1) in the same processing order in accordance with the print settings. For example, the processes are executed for filter 1 in steps S205 to S215 and the processes are executed for filter 2 in steps S220 to S230. The processing order is the same. In FIG. 3, the processes of filters 3 to (n−1) are omitted.

Since the processing order of filters 1 to (n−1) is the same, only filter 1 will be described here. In order to execute the process of filter 1, the controller 20 first activates filter 1 (step S205) and determines whether information specifying the details of the print settings corresponding to filter 1 exists (step S210). Subsequently, in step S210, when it is determined that the information specifying the details of the print settings corresponding to filter 1 exists, data regarding the processing target page is extracted with reference to the print job data 31 and the details of the print settings are applied by executing the process of filter 1 (step S215). Alternatively, when it is determined that the details of the print settings corresponding to filter 1 do not exist in step S210, step S215 is skipped.

In filters 2 to (n−1), when the information specifying the details of the print setting corresponding to each filter exists, a process of applying the print settings of the details is executed. Since filter n is a filter for executing the rendering, process is necessarily executed on filter n. That is, the controller 20 executes the process on filter (n−1), activates filter n (step S250), executes the process of filter n for the data subjected to the process of applying the print settings until filter (n−1), and generates a print image of a printing target page (step S255).

Figure 2:
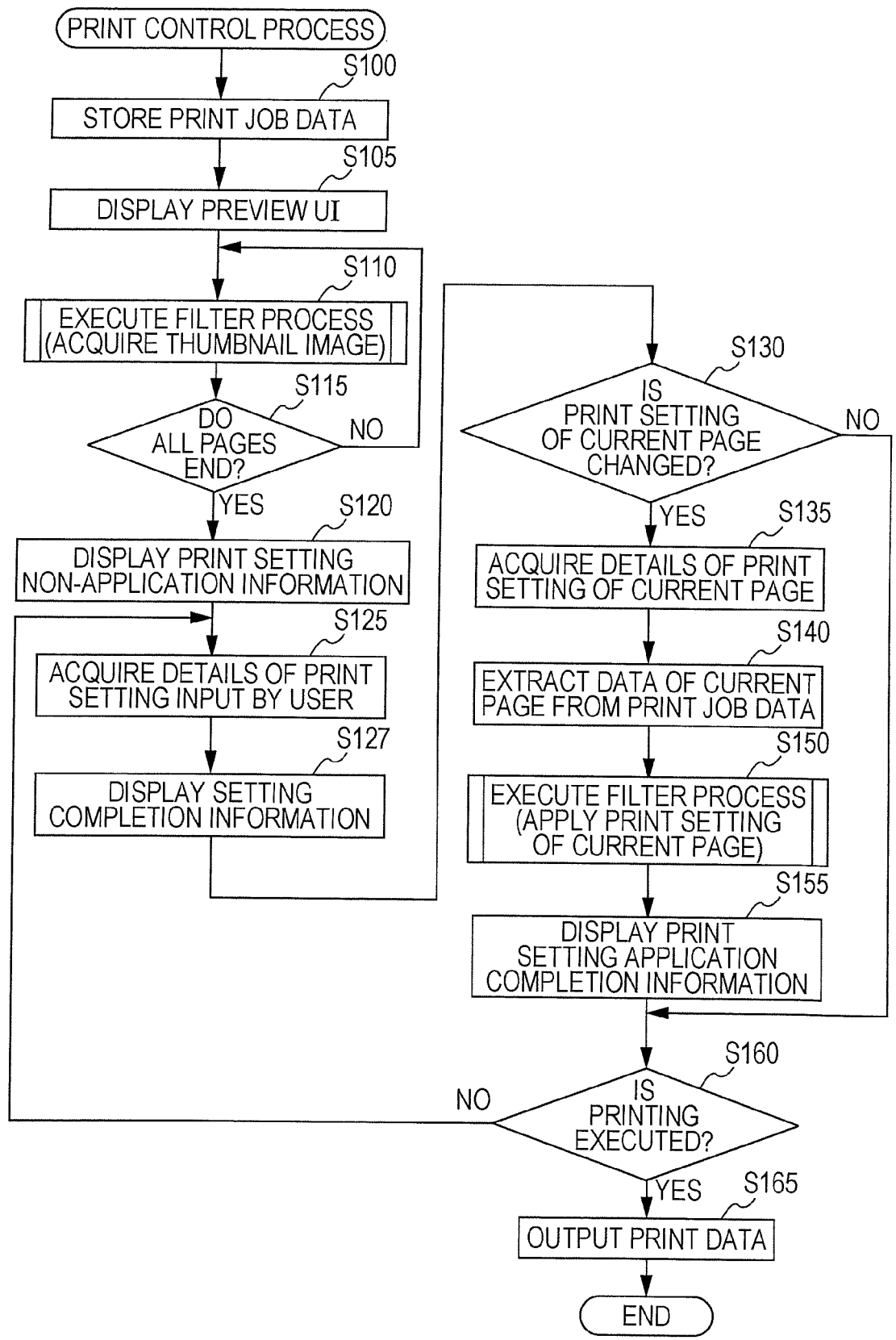
FIG. 2 is a flowchart illustrating a print control process.

In step S110 shown in FIG. 2, the process of applying the print settings of filters 1 to (n−1) is not executed. Therefore, when a sub-routine shown in FIG. 3 is executed in step S110, a print image to which the print settings are not applied is generated. Accordingly, in step S110, a thinning process or a reducing process is executed in accordance with the print image to acquire a thumbnail image of the printing target page. In step S110, the thumbnail image of the printing target passage is acquired in this manner. Therefore, when it is determined that the process ends for all the pages in step S115, the thumbnail images of all the pages are obtained.

Subsequently, the controller 20 uses the thumbnail images as the print setting non-application information 51*b* by the process of the display control section 22*d* and allows the display device 51 to display the print setting non-application information (step S120). In the example of FIG. 4, the icon P of the page shows the thumbnail image of the print image of each page.

Subsequently, the controller 20 acquires the print settings input by the user (step S125) and allows the display device 51 to display the setting completion information representing the print settings corresponding to each classification unit (step S127). That is, when the user operates the input device 50 to input the details of the print settings corresponding to an arbitrary classification unit contained in the print job, the details of the print settings are acquired and the setting completion information representing the print settings corresponding to each classification unit is displayed. In the example of FIG. 4, the details of the print settings can be input by one of setting executed by using preset information 51*e*1 to preset information 51*e*3 and setting executed by using a print setting execution button 51*d*.

That is, in this embodiment, preset information regulating the details of the plurality of print settings is defined in advance and stored in the storage medium 30 (preset information 32 of FIG. 1). Therefore, the controller 20 displays the preset information 32 on a preview window 51*a* as choices with reference to the preset information 32. FIG. 4 shows the example where three types of preset information are defined in advance. In this example, the existence of the preset information is shown by rectangular icons 51*e*1 to 51*e*3.

That is, the icon 51*e*1 indicates preset 1 where the details of the print settings for the kind of sheet correspond to a normal sheet and the details of print settings for the size of the sheet corresponds to the A3. Likewise, the icon 51*e*2 indicates preset 2 where the details of the print settings for the kind of sheet correspond to a photo sheet and the details of print settings for the size of the sheet corresponds to the L edition. The icon 51*e*3 indicates preset 3 where the details of the print settings for the kind of sheet correspond to a normal sheet and the details of print settings for the size of the sheet corresponds to the A4 size. In the icons 51*e*1 to 51*e*3 of the preview window 51*a*, the partial details of the print settings which can be configured are shown by characters. The details of the print settings for the types of arbitrary printing settings (for example, a Nup function) may be preset.

In the preview window 51*a* shown in FIG. 4, the insides of the rectangular icons 51*e*1 to 51*e*3 representing the preset information are displayed with colors. In addition, as for the printing targets subjected to the print settings corresponding to the preset information indicated by the respective rectangular icons 51*e*1 to 51*e*3, the above-described flag icons $F_J$, $F_D$, and $F_P$ are also displayed with the same colors of the icons 51*e*1 to 51*e*3, respectively. In FIG. 4, the icon $F_J$ representing the print settings for the classification unit of the job and preset 3 corresponding to the icon 51*e*3 are set in the same manner. Therefore, it is assumed that the icon $F_J$ and the icon 51*e*3 are displayed with the same color (in FIG. 4, the same hatching is illustrated the same color is displayed). Likewise, the fact that the icon $F_D$ and preset 1 corresponding to the icon 51*e*1 are set in the same manner is displayed with the same color. In addition, the fact that the icon $F_P$ and preset 2 corresponding to the icon 51*e*2 are set in the same manner is displayed with the same color.

In the above-described configuration, the controller 20 displays the icons 51*e*1 to 51*e*3 representing the preset information on the preview window 51*a* and receive an input operation of the input device 50 to receive the print settings in preset unit. For example, the input device 50 can instruct the icons 51*e*1 to 51*e*3 and receive an operation of instructing the classification unit which is the application target of the instructed preset. With such a configuration, the regulated print settings can be allowed to correspond to the preset information in arbitrary classification unit by executing a so-called copy & paste operation or a drag & drop operation. In addition, as for the classification units corresponding to the preset information by this operation, the flag icons $F_J$, $F_D$, and $F_P$ are displayed with the same colors of the icons 51*e*1 to 51*e*3, respectively. Accordingly, in a display range of the print setting non-application information 51*b* shown on the preview widow 51*a*, each printing target is shown. Moreover, the classification unit and the setting completion information are shown.

When the details of desired print settings are desired to be regulated instead of using the preset information, the print setting execution button 51*d* is used. That is, when the user executes an operation of selecting the print setting execution button 51*d*, the controller 20 allows the display device 51 to display a print setting window (not shown). In the print setting window, any print settings can be selected from the print settings applicable to the printer 52. The details of the selected print settings can be designated and the details of the print settings can be specified by designating an arbitrary classification unit.

Subsequently, the controller 20 displays the print setting application completion information 51*c* of the current page. That is, in this embodiment, a target displaying the print setting application completion information 51*c* can be selected from the printing targets. The selected printing target is called a current page. For example, in the example shown in FIG. 4, a page surrounded by a black frame F is the current page.

In order to display the print setting application completion information 51*c*, the controller 20 determines whether the print settings of the current page are changed (step S130). That is, the controller 20 determines that the change in the print setting of the current page is decided, when the print settings of the current page input in step S125 are different from the previous print settings.

When it is determined that the print settings of the current page are not changed in step S130, the controller 20 determines whether the user executes the print execution instruction using a print execution instruction button 51e (step S160). In addition, the processes subsequent to step S125 are repeatedly executed until it is determined that the print execution instruction is made in step S160.

Alternatively, when it is determined that the print settings of the current page are changed in step S130, a process of displaying the print setting application completion information 51c is executed in accordance with the changed print settings. That is, the controller 20 acquires the print settings of the current page (step S135). The controller 20 extracts data of the current page from the print job data 31 (step S140) and executes the filtering process to apply the print settings to the current page (step S150). When there are the plurality of current pages, data of the plurality of pages are extracted from the print job data 31 in step S140.

The filtering process executed in step S150 is the process shown in FIG. 3. However, since the processing target page is the above-described current page, the print settings acquired in step S200 is the print settings acquired in step S135. Therefore, when the process shown in FIG. 3 is executed, a print image of the current page to which the print settings determined in the print setting window is applied is generated.

After the process of step S255 is executed and returns to the process of FIG. 2, the controller 20 allows the display device 51 to display the print setting application completion information 51c of the current page on the basis of the above-described print image (step S155). FIG. 4 shows an example where a state where the print settings of the Nup are applied to the current page shown in the frame F when the detail of the print setting are N=2 is displayed as the print setting application completion information 51c.

When the print execution instruction is made in step S160, the controller 20 outputs the print data to the printer 52 (step S165). That is, each print setting is decided by the details input in step S125 and the filtering process shown in FIG. 3 is executed on all the pages contained in the print job data 31 by this print setting. As a consequence, since the print data representing the print images of all the pages contained in the print job data 31 are generated, the print data are output to the printer 52 to execute the printing.

According to the above-described processes, the user can grasp the printing target to which the print settings are not applied, the classification unit of each printing target, and the setting completion information from the print setting non-application information 51b and grasp the state where the desired print settings are applied to the current page from the print setting application completion information 51c. Accordingly, even when the printing targets are classified in a complicated manner, for example, when the same page is classified in accordance with different classification units in an overlapping manner, the print settings corresponding to the printing targets can be recognized easily and precisely. Moreover, the user can apply the print settings in accordance with the respective classification units by the use of the preset information without sequentially inputting the details of the plurality of print settings. Therefore, it is possible to determine the details of the print settings with considerable ease.

(3) Other Embodiments

The above-described embodiment is just one example of the invention. The invention may be embodied in various forms, as long as the printing targets classified in accordance with the plurality of classification units are displayed along with the classification units and the setting completion information representing the print settings corresponding to the classification units. For example, in the above-described embodiment, the thumbnail image of each page forming the print job is acquired by executing the filtering process. However, when the thumbnail image of each page is contained in the print job data 31, a process of extracting data included in the print job data 31 may be executed instead of the filtering process.

In the above-described embodiment, the core logic of filters 1' to n' is the same as that of filters 1 to n and two filter are used to execute the process corresponding to one print setting. However, just one filter may be sued to execute the process corresponding to one print setting. For example, in the configuration shown in FIG. 1, filters 1' to n' may be omitted and both the filtering processing section 22c and the filter pipeline manager 23 may use the interface used to execute the process of filters 1 to n. Alternatively, the filtering process upon executing the printing and each process upon executing the print settings may be executed by filters 1 to n. With such a configuration, a resource can be saved.

The method of displaying the information of the preview window 51a is not limited to the configuration shown in FIG. 4. For example, by executing the filtering process on all the pages of which the print settings is changed, the print setting application completion information 51c may be displayed.

Figure 5A:
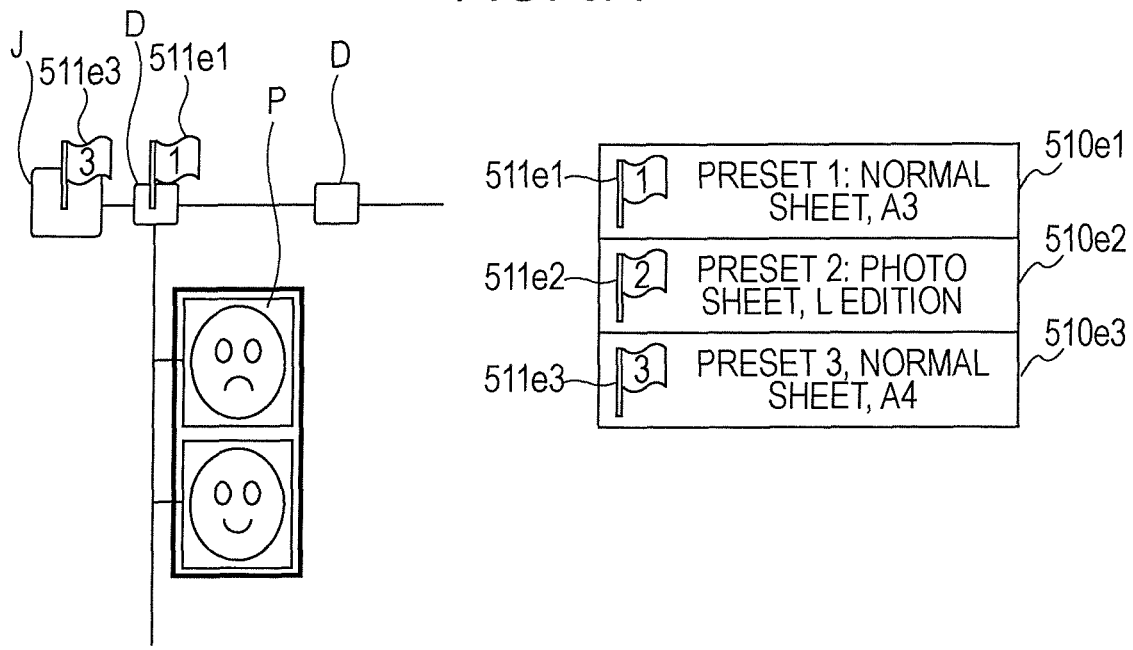
FIGS. 5A and 5B are diagrams illustrating an example of a preview UI.
Figure 5B:
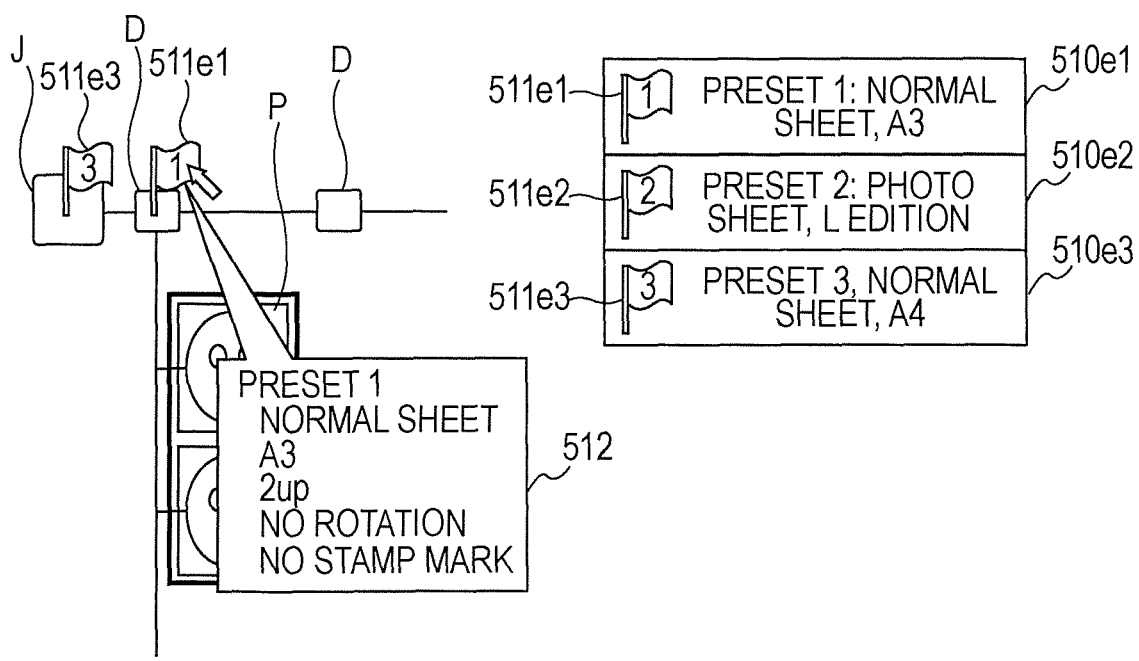

It is configured that the process of determining the print settings by the use of the preset information may be executed more simply. FIGS. 5A and 5B are diagrams illustrating other examples different from that of FIG. 4 and show a display different from that of FIG. 4. In FIG. 5A, rectangular icons 510e1 to 510e3 representing a preset are shown in addition to the configuration shown in FIG. 4 and icons 511e1 to 511e3 respectively corresponding to the details of the presets may be additionally displayed.

With such a configuration, the icons 511e1 to 511e3 respectively corresponding to presets 1 to 3 are icons which are defined to correspond to the details of the plurality of print settings regulated by respective preset information when the preset information is created. For example, in a configuration in which the preset information can be generated in advance in the XPS printer driver 21 or the application program 24, the icons 511e1 to 511e3 correspond to the generated preset information. Icon information representing the icons 511e1 to 511e3 are stored in the storage medium 30. When the controller 20 forms the preview window 51a, information representing the icons 511e1 to 511e3 is acquired. For example, as shown on the right side of FIG. 5A, the icons 511e1 to 511e3 are displayed on the icons 510e1 to 510e3 in an overlapping manner, respectively.

The controller 20 displays the icons 511e1 to 511e3 so as to correspond to the classification unit when the print settings correspond to the printing target, as shown on the left side of FIG. 5A. In this configuration, the user generating the preset information can grasp the details of the preset information easily and precisely when the user views the icons 511e1 to 511e3 to do a work for allowing the icons 511e1 to 511e3 to the presets, respectively. Of course, the shape of the icons is not limited to the shape shown in FIG. 5A. For example, icons intuitively showing the details of the print settings, such as an icon showing a tray being used among trays mounted in a printer may correspond to the presets. In this configuration, it is possible to intuitively acquire the details of the print settings.

FIG. 5B shows a configuration example where the details of the icons 511e1 to 511e3 corresponding to the presets are displayed. In this configuration, the icons 511e1 to 511e3 are formed in advance as icons corresponding to presets 1 to 3 in the same manner as that of FIG. 5A and are displayed on the icons 510e1 to 510e3 in the overlapping manner. In addition to this configuration, the details of each icon are displayed on a display window 512 in FIG. 5B, when the icons 511e1 to 511e3 are indicated.

FIG. 5B shows that the icon 511e1 displayed on the left side of the preview window 51a is indicated by the pointer of a mouse. In this state, the controller 20 specifies the preset corresponding to the icon 511e1 indicated by the pointer. Then, the controller 20 displays the display window 512 and also displays the details of the print settings represented by preset 1 corresponding to the icon 511e1 in the display window 512. In this configuration, it is possible to easily grasp the details of the preset print settings.

The entire disclosure of Japanese Patent Application No. 2008-263579, filed Oct. 10, 2008 is expressly incorporated by reference herein.

What is claimed is:

1. A print setting display device comprising:
   a print job data acquiring section which acquires print job data representing printing targets classified in accordance with a plurality of classification units including a page, a document including the page, and a job including the document;
   a print setting acquiring section which acquires setting completion information representing print settings including a print setting of the page, a print setting of the document, and a print setting of the job; and
   a display control section which allows a predetermined display unit including first, second, and third areas to display concurrently information representing the printing targets in the first area, the classification units in the second area, and the setting completion information in the third area,
   the print setting acquiring section acquiring, as the setting completion information, preset information specifying details of the print setting of the page, the print setting of the document, and the print setting of the job and information representing the page, the document, and the job being targets to which the print setting of the page, the print setting of the document, and the print setting of the job are applied in accordance with the preset information,
   the print setting acquiring section receiving an operation of selecting the preset information from choices of the plurality of acquired preset information and an operation of designating a classification unit from the classification units to apply the selected preset information, the print setting acquiring section acquiring the selected preset information and information representing the designated classification unit as the setting completion information,
   a filtering process of applying the print settings to the printing target being executed with reference to the print job data,
   the display control section allowing the predetermined display unit to display print setting application completion information representing a result obtained by applying the print settings to the printing target.

2. The print setting display device according to claim 1, wherein
   the print setting acquiring section acquires icon information representing an icon corresponding to the preset information when the preset information is created, and
   the display control section displays the setting completion information using the icon.

3. The print setting display device according to claim 1, wherein
   the display control section allows the predetermined display unit to display the details of the print settings represented by the setting completion information, when an operation of instructing the setting completion information is executed by a predetermined input unit.

4. A print control device causing a computer to realize:
   the print setting display device according to claim 1; and
   a print control unit which generates print data by applying print settings to a printing target and controls a printing apparatus on the basis of the print data.

5. A print setting display method comprising:
   acquiring print job data representing printing targets classified in accordance with a plurality of classification units including a page, a document including the page, and a job including the document; and
   acquiring setting completion information representing print settings including a print setting of the page, a print setting of the document, and a printing setting of the job; and
   allowing a predetermined display unit including first, second, third areas to display concurrently information representing the printing targets in the first area, the classification units in the second area, and the setting completion information in the third area,
   the acquiring the setting completion information including acquiring, as the setting completion information, preset information specifying details of the print setting of the page, the print setting of the document, and the print setting of the job and information representing the page, the document, ant the job being targets to which the print setting of the page, the print setting of the document, and the print setting of the job are applied in accordance with the preset information,
   the acquiring the setting completion information including receiving an operation of selecting the preset information from choices of the plurality of acquired preset information and an operation of designating a classification unit from the classification units to apply the selected preset information,
   the acquiring the setting completion information including acquiring as the setting completion information the selected preset information and information representing the designated classification unit,
   the print setting of the page, the print setting of the document, and the print setting of the job being applied to the printing target with reference to the print job data,
   in displaying the information representing the printing target, the predetermined display unit being allowed to display print setting application completion information representing a result obtained by applying the print settings to the printing target.

6. A non-transitory computer readable recording medium having a computer program recorded thereon for causing a computer to execute:
   a process of acquiring print job data representing printing targets classified in accordance with a plurality of classification units including a page, a document including the page, and a job including the document; and a process of acquiring setting completion information representing print settings including a print setting of the page, a print setting of the document, and a print setting of the job; and a process of allowing a predetermined display unit including first, second, and third areas to display concurrently information representing the printing targets in the first area, the classification units in the second area, and the setting completion information in the third area, the acquiring the setting completion information including acquiring, as the setting completion information, preset information specifying details of the print setting of the page, the print setting of the document, and the print setting of the job and information representing the page, the document, and the job being targets to which the print setting of the page, the print setting of the document, and the print setting of the job are applied in accordance with the preset information, the acquiring the setting completion information including receiving an operation of selecting the preset information from choices of the plurality of acquired preset information and an operation of designating a classification unit from the classification units to apply the selected preset information, the acquiring the setting completion information including acquiring as the setting completion information the selected preset information and information representing the designated classification unit, the print setting of the page, the print setting of the document, and the print setting of the job being applied to the printing target with reference to the print job data, in the process of displaying the information representing the printing target, the predetermined display unit being allowed to display print setting application completion information representing a result obtained by applying the print settings to the printing target.

\* \* \* \* \*